United States Patent
Bizet et al.

(10) Patent No.: US 12,083,709 B2
(45) Date of Patent: *Sep. 10, 2024

(54) COMPOSITIONS FOR BIPOLAR PLATES AND METHODS FOR MANUFACTURING SAID COMPOSITIONS

(71) Applicant: Arkema France, Colombes (FR)

(72) Inventors: Stéphane Bizet, Serquigny (FR); Jérôme Chauveau, Serquigny (FR)

(73) Assignee: Arkema France, Colombes (FR)

( * ) Notice: Subject to any disclaimer, the term of this patent is extended or adjusted under 35 U.S.C. 154(b) by 590 days.

This patent is subject to a terminal disclaimer.

(21) Appl. No.: 17/277,371

(22) PCT Filed: Sep. 18, 2019

(86) PCT No.: PCT/FR2019/052175
§ 371 (c)(1),
(2) Date: Mar. 18, 2021

(87) PCT Pub. No.: WO2020/058627
PCT Pub. Date: Mar. 26, 2020

(65) Prior Publication Data
US 2021/0354332 A1 Nov. 18, 2021

(30) Foreign Application Priority Data
Sep. 21, 2018 (FR) ..................... 1858598

(51) Int. Cl.
| | | |
|---|---|---|
| *B29B 9/12* | (2006.01) |
| *B29B 9/02* | (2006.01) |
| *B29C 43/00* | (2006.01) |
| *B29C 45/00* | (2006.01) |
| B29K 23/00 | (2006.01) |
| B29K 81/00 | (2006.01) |
| B29K 507/04 | (2006.01) |
| B29K 509/00 | (2006.01) |
| H01M 8/0226 | (2016.01) |
| H01M 50/406 | (2021.01) |
| H01M 50/446 | (2021.01) |

(52) U.S. Cl.
CPC ............... *B29B 9/12* (2013.01); *B29B 9/02* (2013.01); *B29C 43/003* (2013.01); *B29C 45/0001* (2013.01); B29C 45/0013 (2013.01); B29K 2023/06 (2013.01); B29K 2023/12 (2013.01); B29K 2081/04 (2013.01); B29K 2507/04 (2013.01); B29K 2509/00 (2013.01); B29K 2995/0005 (2013.01); H01M 8/0226 (2013.01); H01M 50/406 (2021.01); H01M 50/446 (2021.01)

(58) Field of Classification Search
CPC ........ B29B 9/12; B29B 9/02; B29K 2509/00; B29C 43/003; B29C 45/0001
USPC ........................................................ 524/495
See application file for complete search history.

(56) References Cited

U.S. PATENT DOCUMENTS

| | | |
|---|---|---|
| 2002/0136941 A1 | 9/2002 | Bonnet et al. |
| 2004/0262584 A1 | 12/2004 | Bonnet et al. |
| 2005/0042496 A1 | 2/2005 | Bisara et al. |
| 2017/0200958 A1 | 7/2017 | Buvat et al. |

FOREIGN PATENT DOCUMENTS

| | | | |
|---|---|---|---|
| JP | 2009231034 A | | 10/2009 |
| JP | 2011119124 A | * | 6/2011 |
| KR | 100764008 B1 | * | 10/2007 |
| KR | 20090129704 A | * | 12/2009 |
| WO | WO8900755 | | 1/1989 |

OTHER PUBLICATIONS

Translation of KR 2009-0129704, Dec. 17, 2009. (Year: 2009).*
Translation of KR 100764008, Oct. 9, 2007. (Year: 2007).*
Planesa E. et al; "Polymer composites bipolar plates for PEMFCs"; Energy Procedia; vol. 20; 2012; pp. 311-323.

* cited by examiner

*Primary Examiner* — Hui H Chin
(74) *Attorney, Agent, or Firm* — Joanne Rossi

(57) ABSTRACT

The present invention relates to new compositions for bipolar plates and to methods for manufacturing said compositions. More specifically, the invention relates to a method for manufacturing a composition, comprising the following steps: mixing a thermoplastic polymer in the molten state with a first conductive charge in order to obtain a conductive thermoplastic polymer; grinding said conductive thermoplastic polymer in order to reduce it to a powder; mixing the conductive thermoplastic polymer powder with a second conductive charge.

8 Claims, No Drawings

COMPOSITIONS FOR BIPOLAR PLATES AND METHODS FOR MANUFACTURING SAID COMPOSITIONS

This application is a national stage application under 35 U.S.C. § 371 of PCT Application PCT/FR2019/052175, filed Sep. 18, 2019; which claims benefit to French National Patent Number 1858598, filed Sep. 21, 2018; said applications incorporated herein by reference.

TECHNICAL FIELD

The present invention relates to novel compositions for bipolar plates and to processes for manufacturing said compositions.

TECHNICAL CONTEXT

Bipolar plates are used in fuel cells and in redox flow batteries. They may be made from various materials: metallic bipolar plates, graphite plates and carbon-polymer composite plates.

The principle of bipolar plates based on organic composite materials is based on the use of conductive fillers (carbon, graphite, etc.) dispersed in a thermoplastic or thermosetting polymer. The fillers provide bipolar plates with the electrical conductivity required for collecting current and the polymer matrix provides them with the proper mechanical strength required for the assembly of the various elements.

Carbon-polymer composite bipolar plates have advantageous properties: high electrical conductivity, good corrosion resistance, good performance at high temperatures, and good mechanical properties, together with a manufacturing cost which is relatively low. In these composite bipolar plates, a thermosetting or thermoplastic polymer is used as a matrix for a carbon-based filler chosen from graphite, carbon fibers, carbon black or carbon nanotubes. Although the electrical performance of the composite bipolar plates is mainly determined by the carbon-based filler, the material making up the polymer matrix has also an influence on the electrical behavior of the composite.

The thermosetting resins studied as possible matrices for composite bipolar plates are mainly resins of epoxy type, phenolic resins and resins of vinyl ester or polyester type. They have numerous advantages, such as: a low viscosity, which makes it possible to load them with high contents of conductive fillers; corrosion resistance; dimensional and thermal stability. However, these porous matrices are fragile. In order to improve their mechanical properties at break, matrices based on a thermosetting polymer incorporating thermoplastic polymer nodules have been prepared; however, the adhesion between the two types of polymers is still inadequate for improving the polymer matrix properties.

Bipolar plates having a matrix based on thermoplastic polymers have also been manufactured, as reported, for example, in the publication by Planesa E. et al. "*Polymer composites bipolar plates for PEMFCs*" published in Energy Procedia 20 (2012) 311-323. Among the thermoplastic polymers listed in this context are polypropylene, polyvinylidene fluoride or poly(phenylene sulfide). The results of various tests using various thermosetting polymers and polypropylene have made it possible to characterize the mechanical and electrical conductivity properties of the bipolar plates thus manufactured. As a result, the final properties of the plate depend on the process for manufacturing the polymer matrices and on that of the bipolar plates.

FR 3021811 describes a process for manufacturing a composite bipolar plate from a composition comprising at least one lamellar graphite and at least one thermoplastic polymer, said process comprising the steps of dry-screening the composition, dry-blending the screened composition, depositing the mixed composition in a mold, and thermo-compression-molding the mixed composition.

EP 1466372 and EP 1207535 describe microcomposite powders consisting of graphite particles and fluoropolymer particles which may be extruded or injected into a press for manufacturing bipolar plates.

US 2005/0042496 describes a process for manufacturing shaped articles based on conductive composites, such as bipolar plates, in which a plastic material chosen from thermoplastics and elastomers, and graphite, are melt-blended, and the molten mass is subjected to a molding process to produce the conductive shaped article. However, when PVDF is used in this process, the mixture of the molten components is viscous and thus difficult to implement.

There is a need to provide a composition for manufacturing bipolar plates which have good thermal conductivity and electrical conductivity properties, together with satisfactory mechanical properties, and which can be readily implemented.

SUMMARY OF THE INVENTION

According to a first aspect, the invention relates to the manufacture of a composition, comprising the following steps:
  mixing a molten thermoplastic polymer with a first conductive filler so as to obtain a conductive thermoplastic polymer;
  milling said conductive thermoplastic polymer to reduce it to powder;
  mixing the conductive thermoplastic polymer powder with a second conductive filler.

According to one embodiment, the second conductive filler is graphite.

According to one embodiment, the first conductive filler is chosen from: electrically conductive polymers, carbon black, carbon nanotubes, graphene, graphite, carbon fibers and mixtures thereof, the first conductive filler preferably being carbon black.

According to one embodiment, the conductive thermoplastic polymer is chosen from polypropylene, polyethylene and poly(phenylene sulfide).

The invention also relates to a composition obtained via the process described above.

The invention also relates to a composition comprising a second conductive filler and particles of a conductive thermoplastic polymer. In a characteristic manner, the particles of the conductive thermoplastic polymer comprise a thermoplastic polymer matrix in which a first conductive filler is dispersed.

According to one embodiment, in the composition according to the invention, the conductive thermoplastic polymer is present in an amount ranging from 10% to 40%, preferably from 10% to 30%, advantageously from 10% to 25%, and the second conductive filler is present in an amount ranging from 60% to 90%, preferably from 70% to 90%, advantageously from 75% to 90%, based on the total weight of the composition.

According to one embodiment, in the conductive thermoplastic polymer composition, the first conductive filler is present in an amount of from 0.1% to 35% by weight, preferably from 1% to 20% by weight, advantageously from 2.5% to 15% by weight, based on the total weight of said composition.

According to another aspect, the invention relates to a process for manufacturing a bipolar plate, comprising the following steps:
preparing a composition according to the process described above, or providing a composition as described above, and
subjecting said composition to compression molding.

The invention also relates to a bipolar plate obtained via the process described above or comprising the composition described above.

The present invention makes it possible to overcome the drawbacks of the prior art. It more particularly provides compositions which may readily be implemented for manufacturing bipolar plates having at least one of the following features: a surface resistivity of less than 0.01 ohm·cm, a volume resistivity of less than 0.03 ohm·cm, a thermal conductivity of greater than 10 W/m/K and good mechanical properties such as flexural strength and compressive strength.

This is achieved by virtue of the use of a binder comprising a thermoplastic polymer in which a conductive filler is dispersed. The use of an electrically conductive binder thus obtained has several advantages. Firstly, the use of a conductive binder makes it possible to decrease the resistivity of the plates by reducing, or even eliminating, the electrically insulating domains of polymer between the particles of the main filler of the plate. Secondly, it makes it possible to avoid subsequent treatment of the bipolar plate surfaces, for example by sandblasting, which is often required following plate manufacture via compression molding, in order to remove the layer of insulating polymer when the binder consists of a thermoplastic polymer alone.

The invention also provides a process for preparing compositions having the abovementioned advantages. Mixing a molten thermoplastic polymer with a first conductive filler, and then incorporating into said mixture a second conductive filler, in a separate step, makes it possible to obtain a composite bipolar plate composition in which the binder comprises a conductive thermoplastic polymer, i.e., a thermoplastic polymer in which a first conductive filler is dispersed. The conductive thermoplastic polymer may then be readily implemented.

DESCRIPTION OF EMBODIMENTS OF THE INVENTION

The invention is described in further detail below.
The percentages indicated herein are mass percentages.
Bipolar Plate Composition According to a first aspect, the invention relates to a composition that is suitable for use in manufacturing bipolar plates. The composition comprises a mixture of particles of a carbon-based conductive filler, referred to herein as "second conductive filler", and particles of a conductive thermoplastic polymer, which comprise a conductive filler (referred to herein as "first conductive filler") dispersed in a thermoplastic polymer matrix.

According to various embodiments, said composition comprises the following features, combined where appropriate.

The composition may be in the form of a powder and, in this case, the conductive thermoplastic polymer particles are mixed with the second conductive filler particles.

According to another embodiment, the composition may be in agglomerated solid form, and, in this case, the second conductive filler particles are bound to the particles (or domains) of conductive thermoplastic polymer. It is in this agglomerated form that the composition is shaped as a bipolar plate.

Dispersing the first conductive filler in the thermoplastic polymer results in the latter being conductive. A thermoplastic polymer is conductive when the resistance of a filament of said polymer is less than $10^6$ ohms. Preferably, the loading of the first conductive filler is such that the percolation threshold through the thermoplastic polymer matrix is reached.

Preferably, the second conductive filler and the first conductive filler dispersed in the thermoplastic polymer are different from each other as regards their mean size or their size distribution and/or their nature.

Advantageously, the second conductive filler is graphite.

The volume-mean diameter (Dv50) of the second conductive filler may be less than or equal to 2500 μm, preferably less than or equal to 1000 μm, and more preferably less than or equal to 500 μm.

According to certain embodiments, the Dv50 of the second conductive filler ranges from 10 μm to 50 μm, or from 50 to 100 μm, or from 100 to 150 μm, or from 150 to 200 μm, or from 200 to 250 μm, or from 250 to 300 μm, or from 300 to 350 μm, or from 350 to 400 μm, or from 400 to 450 μm, or from 450 to 500 μm, or from 500 to 600 μm, or from 600 to 700 μm, or from 700 to 800 μm, or from 800 to 900 μm, or from 900 to 1000 μm, or from 1000 to 1100 μm, or from 1100 to 1200 μm, or from 1200 to 1300 μm, or from 1300 to 1400 μm, or from 1400 to 1500 μm, or from 1500 to 1600 μm, or from 1600 to 1700 μm, or from 1700 to 1800 μm, or from 1900 to 2000 μm, or from 2000 to 2100 μm, or from 2100 to 2200 μm, or from 2200 to 2300 μm, or from 2300 to 2400 μm, or from 2400 to 2500 μm.

The Dv50 is the particle diameter at the 50th percentile of the cumulative particle size distribution. This parameter may be measured by laser granulometry.

The composition may comprise from 60% to 90% by weight of a second conductive filler, based on the total weight of the composition. According to certain embodiments, the composition comprises, by weight, from 60 to 65%, or from 65 to 70%, or from 70 to 75%, or from 75 to 80%, or from 80 to 85%, or from 85 to 90%, of a second conductive filler, based on the total weight of the composition.

The conductive thermoplastic polymer particles may have a Dv50 ranging from 0.1 μm to 1 mm, more particularly from 0.1 μm to 5 μm, or from 5 μm to 50 μm, or from 50 μm to 100 μm, or from 100 μm to 200 μm, or from 200 μm to 300 μm, or from 300 μm to 400 μm, or from 400 μm to 500 μm, or from 500 μm to 600 μm, or from 600 μm to 700 μm, or from 700 μm to 800 μm, or from 800 μm to 900 μm, or from 900 μm to 1 mm.

The first conductive filler dispersed in the conductive thermoplastic polymer may be an electrically conductive polymer. Electrically conductive polymers which are suitable for this purpose are polyacetylene, polyphenylene vinylene, polythiophene, polyaniline, polypyrrole and poly(phenylene sulfide) polymers or mixtures thereof. According to another embodiment variant, or in addition, the first conductive filler may comprise electrically conductive carbon particles, such as carbon black, carbon nanotubes, graphene, graphite, carbon fibers or a mixture of two types of particles from this list.

The first conductive filler dispersed in the thermoplastic polymer matrix may have a specific surface area, measured by nitrogen adsorption via the BET method according to the standard ASTM D3037, ranging from 0.1 m²/g to 2000 m²/g and preferably from 10 m² to 1000 m²/g. According to certain embodiments, the first conductive filler may have a BET specific surface area ranging from 0.1 to 1 m²/g, or from 1 to 10 m²/g, or from 10 to 50 m²/g, or from 10 to 50 m²/g, or from 50 to 200 m²/g, or from 200 to 400 m²/g, or from 400 to 600 m²/g, or from 600 to 800 m²/g, or from 800 to 1000 m²/g, or from 1000 to 1200 m²/g, or from 1200 to 1400 m²/g, or from 1400 to 1600 m²/g, or from 1600 to 1800 m²/g, or from 1800 to 2000 m²/g.

The conductive thermoplastic polymer is preferably chosen from polypropylene, polyethylene and poly(phenylene sulfide). It may be a mixture of at least two of said polymers.

According to one embodiment, in the composition according to the invention, the conductive thermoplastic polymer is present in an amount ranging from 10% to 40%, preferably from 10% to 30%, advantageously from 15% to 25%, based on the total weight of the composition.

Bipolar Plate

The invention also relates to a bipolar plate comprising the composition described above, in an agglomerated form. A bipolar plate is a plate which separates the elementary cells in fuel cells and redox flow batteries. In general, it has a parallelepipedal shape having a thickness of a few millimeters (typically between 0.2 and 6 mm) and comprises on each face a network of channels for the circulation of gases and fluids. Its role consists in feeding the fuel cell with gaseous fuel, eliminating the reaction products and collecting the electrical current produced by the cell.

Advantageously, the bipolar plate has at least one of the following features, and preferably all of said features:
- a surface resistivity of less than or equal to 0.01 ohm·cm;
- a volume resistivity of less than or equal to 0.03 ohm·cm;
- a thermal conductivity of greater than or equal to 10 W/m/K;
- a flexural strength of greater than or equal to 25 N/mm²;
- a compressive strength of greater than or equal to 25 N/mm².

The flexural strength is measured according to the standard DIN EN ISO 178. The compressive strength is measured according to the standard ISO 604. The thermal conductivity is measured according to the laser flash technique according to the standard DIN EN ISO 821. The surface resistivity is measured using four-point probe samples on milled samples having a thickness of 4 mm. The volume resistivity is measured using a two-electrode device and a contact pressure of 1 N/mm² on surfaced samples 13 mm in diameter and 2 mm thick.

According to certain embodiments, the bipolar plate has a surface resistivity of less than or equal to 0.008 ohm·cm, or of less than or equal to 0.005 ohm·cm, or of less than or equal to 0.003 ohm·cm, or of less than or equal to 0.001 ohm·cm.

According to certain embodiments, the bipolar plate has a through-plane resistivity of less than or equal to 0.025 ohm·cm, or of less than or equal to 0.02 ohm·cm, or of less than or equal to 0.015 ohm·cm.

According to certain embodiments, the bipolar plate has a thermal conductivity of greater than or equal to 15 W/m/K, or of greater than or equal to 20 W/m/K.

According to certain embodiments, the bipolar plate has a flexural strength of greater than or equal to 30 N/mm², or of greater than or equal to 35 N/mm².

Processes

According to another aspect, the invention relates to a process for manufacturing the composition described above, comprising the following steps:
- mixing the molten thermoplastic polymer with the first conductive filler so as to obtain the conductive thermoplastic polymer;
- milling said conductive thermoplastic polymer to reduce it to powder;
- mixing the conductive thermoplastic polymer powder with the second conductive filler.

In this process, the first conductive filler, the thermoplastic polymer and the second conductive filler may have any feature described above as being optional or preferred, relating to the bipolar plate composition.

The process according to the invention comprises a step of melt-blending the thermoplastic polymer with the first conductive filler so as to obtain the conductive thermoplastic polymer. This step makes it possible to formulate an intimate mixture of thermoplastic polymer with the first conductive filler, the mixture being called the "conductive thermoplastic polymer". Preferably, said first conductive filler is dispersed in the thermoplastic polymer.

Preferably, the thermoplastic polymer and the first conductive filler to be melt-blended are in powder form.

The first conductive filler dispersed in the thermoplastic polymer matrix may have a specific surface area, measured by nitrogen adsorption via the BET method according to the standard ASTM D3037, ranging from 0.1 m²/g to 2000 m²/g and preferably from 10 m² to 1000 m²/g. According to certain embodiments, the first conductive filler may have a BET specific surface area ranging from 0.1 to 1 m²/g, or from 1 to 10 m²/g, or from 10 to 50 m²/g, or from 10 to 50 m²/g, or from 50 to 200 m²/g, or from 200 to 400 m²/g, or from 400 to 600 m²/g, or from 600 to 800 m²/g, or from 800 to 1000 m²/g, or from 1000 to 1200 m²/g, or from 1200 to 1400 m²/g, or from 1400 to 1600 m²/g, or from 1600 to 1800 m²/g, or from 1800 to 2000 m²/g.

According to one embodiment, the melt-blending step is performed by extrusion, using, for example, a blender or a twin-screw extruder. In order to obtain good dispersion of the first conductive fillers in the thermoplastic polymer, a screw profile resulting in dispersive mixing by virtue of a high shear rate will be preferred.

According to one embodiment, in a conventional extrusion process for melt-blending a thermoplastic polymer with the first conductive filler, the polymer granules are melted by conveying them along the screw which is heated to temperatures ranging from Tm+20 to Tm+70° C. (Tm being the melting point of the thermoplastic polymer). The conductive filler is preferably fed by means of a metering unit. Preferably, after extrusion, the granules are obtained using a filament cutting process or by wet granulation.

The conductive thermoplastic polymer may contain, by weight, from 0.1% to 1%, or from 1% to 2.5%, or from 2.5% to 5%, or from 5% to 10%, or from 10% to 15%, or from 15% to 20%, or from 20% to 25%, or from 25% to 30%, or from 30% to 35% of the first conductive filler, based on the weight of the conductive thermoplastic polymer.

The conductive thermoplastic polymer may be produced in the form of granules.

The process according to the invention also comprises a step of milling said conductive thermoplastic polymer, to reduce it to powder. Any milling means may be used, for example a hammer mill. According to certain embodiments, the conductive thermoplastic polymer powder may have a Dv50 ranging from 0.1 µm to 1 mm, more particularly from 0.1 µm to 5 µm, or from 5 µm to 50 µm, or from 50 µm to 100 μm, or from 100 μm to 200 μm, or from 200 μm to 300 μm, or from 300 μm to 400 μm, or from 400 μm to 500 μm, or from 500 μm to 600 μm, or from 600 μm to 700 μm, or from 700 μm to 800 μm, or from 800 μm to 900 μm, or from 900 μm to 1 mm.

The conductive thermoplastic polymer powder is then mixed with the second conductive filler.

The second conductive filler may be in powder form. The volume-mean diameter (Dv50) of the second conductive filler may be less than or equal to 2500 μm, preferably less than or equal to 1000 μm, and more preferably less than or equal to 500 μm.

According to certain embodiments, the Dv50 of the second conductive filler ranges from 10 μm to 50 μm, or from 50 to 100 μm, or from 100 to 150 μm, or from 150 to 200 μm, or from 200 to 250 μm, or from 250 to 300 μm, or from 300 to 350 μm, or from 350 to 400 μm, or from 400 to 450 μm, or from 450 to 500 μm, or from 500 to 600 μm, or from 600 to 700 μm, or from 700 to 800 μm, or from 800 to 900 μm, or from 900 to 1000 μm, or from 1000 to 1100 μm, or from 1100 to 1200 μm, or from 1200 to 1300 μm, or from 1300 to 1400 μm, or from 1400 to 1500 μm, or from 1500 to 1600 μm, or from 1600 to 1700 μm, or from 1700 to 1800 μm, or from 1900 to 2000 μm, or from 2000 to 2100 μm, or from 2100 to 2200 μm, or from 2200 to 2300 μm, or from 2300 to 2400 μm, or from 2400 to 2500 μm.

The mixing step may be performed by incorporating the second conductive filler into the conductive thermoplastic polymer powder. Advantageously, this mixing step is a compounding step performed in an extruder, for example in a twin-screw extruder.

According to one embodiment, the conductive thermoplastic polymer is present in an amount ranging from 10% to 40%, preferably from 10% to 30%, advantageously from 10% to 25%, based on the total weight of the composition. The conductive thermoplastic polymer is preferably present in a mass proportion ranging from 10% to 15%, or from 15% to 20%, or from 20% to 25%, or from 25% to 30%, or from 30% to 35%, or from 35% to 40%, based on the total weight of the bipolar plate composition.

The second conductive filler may be present in a mass proportion of from 60% to 90%, or from 60% to 65%, or from 65% to 70%, or from 70% to 75%, or from 75% to 80%, or from 80% to 85%, or from 85% to 90%, based on the total weight of the bipolar plate composition.

The invention also relates to a bipolar plate composition manufactured by means of the process described above.

According to another aspect, the invention relates to a process for manufacturing a bipolar plate, comprising the following steps:
preparing a composition according to the process described above;
subjecting the composition to compression molding.

Preferably, the bipolar plate composition is subjected to compression molding in powder form.

The process according to the invention may also comprise a step of milling said powder, for example by means of a disk mill.

Compression molding of compositions for producing bipolar plates may be performed by introducing said composition into a mold, for example a stainless-steel mold, which is then closed and heated to a temperature ranging from 200° C. to 350° C., preferably from 250° C. to 300° C. A compression force of from 300 t to 800 t, preferably from 400 t to 600 t, is then applied to the mold, for a mold of dimensions ranging from 100 000 to 150 000 mm². Typically, a compression force of 500 t is applied when the size of the mold is 130 000 mm² and a compression force of 300 t is applied when the size of the mold is 44 000 mm². The mold is then cooled to a temperature of from 50° C. to 120° C., preferably from 60° C. to 100° C., and the plate is removed from the mold.

Advantageously, the bipolar plate has at least one of the following features, and preferably all of said features:
a surface resistivity of less than or equal to 0.01 ohm·cm;
a volume resistivity of less than or equal to 0.03 ohm·cm;
a thermal conductivity of greater than or equal to 10 W/m/K;
a flexural strength of greater than or equal to 25 N/mm²;
a compressive strength of greater than or equal to 25 N/mm².

The flexural strength is measured according to the standard DIN EN ISO 178. The compressive strength is measured according to the standard ISO 604. The thermal conductivity is measured according to the laser flash technique according to the standard DIN EN ISO 821. The surface resistivity is measured using four-point probe samples on milled samples having a thickness of 4 mm. The volume resistivity is measured using a two-electrode device and a contact pressure of 1 N/mm² on surfaced samples 13 mm in diameter and 2 mm thick.

According to certain embodiments, the bipolar plate has a surface resistivity of less than or equal to 0.008 ohm·cm, or of less than or equal to 0.005 ohm·cm, or of less than or equal to 0.003 ohm·cm, or of less than or equal to 0.001 ohm·cm.

According to certain embodiments, the bipolar plate has a through-plane resistivity of less than or equal to 0.025 ohm·cm, or of less than or equal to 0.02 ohm·cm, or of less than or equal to 0.015 ohm·cm.

According to certain embodiments, the bipolar plate has a thermal conductivity of greater than or equal to 15 W/m/K, or of greater than or equal to 20 W/m/K.

According to certain embodiments, the bipolar plate has a flexural strength of greater than or equal to 30 N/mm², or of greater than or equal to 35 N/mm².

The invention claimed is:

1. A process for manufacturing a composition, comprising the following steps:
mixing a molten thermoplastic polymer with a first conductive filler so as to obtain a conductive thermoplastic polymer;
milling said conductive thermoplastic polymer to reduce it to powder having a volume-mean diameter (Dv50) ranging from 0.1 μm to 1 mm;
mixing the conductive thermoplastic polymer powder with a second conductive filler,
wherein the first conductive filler comprises from 5% to 15% by weight, based on the weight of said conductive thermoplastic polymer.

2. The process of claim 1, wherein the second conductive filler is graphite.

3. The process of claim 1, wherein the first conductive filler is chosen from: electrically conductive polymers, carbon black, carbon nanotubes, graphene, graphite, carbon fibers and mixtures thereof.

4. The process of claim 1, wherein the step in which the conductive thermoplastic polymer powder is mixed with a second conductive filler is a compounding step performed in an extruder.

5. The process of claim 1, wherein the conductive thermoplastic polymer is present in an amount ranging from 10% to 40%, and the second conductive filler is present in an amount ranging from 60% to 90%, based on the total weight of the composition.

6. The process of claim 1, wherein the conductive thermoplastic polymer is chosen from polypropylene, polyethylene and poly(phenylene sulfide).

7. A process for manufacturing a bipolar plate, comprising the following steps:
   preparing a composition according to the process of claim 1;
   subjecting the composition to compression molding.

8. The bipolar plate obtained via the process of claim 7.

* * * * *